| (12) | United States Patent | (10) Patent No.: | US 8,910,031 B1 |
|---|---|---|---|
| | Liu et al. | (45) Date of Patent: | Dec. 9, 2014 |

(54) DIF-CRC BASED FAST HASHING

(75) Inventors: ZhiGang Liu, Westford, MA (US); Dale Elliott, Northborough, MA (US); Stephen Richard Ives, West Boylston, MA (US); Shen Liu, Westborough, MA (US); Andrew Chanler, North Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 502 days.

(21) Appl. No.: 13/065,748

(22) Filed: Mar. 29, 2011

(51) Int. Cl.
G06F 13/00 (2006.01)
G06F 13/28 (2006.01)
H03M 13/00 (2006.01)

(52) U.S. Cl.
USPC ........... 714/807; 711/111; 711/112; 711/113; 711/114; 711/161; 711/162; 714/799; 714/758; 714/766; 714/770

(58) Field of Classification Search
None
See application file for complete search history.

(56) References Cited

U.S. PATENT DOCUMENTS

| 5,206,939 | A | | 4/1993 | Yanai et al. | |
|---|---|---|---|---|---|
| 5,581,743 | A | * | 12/1996 | Burton et al. | 703/26 |
| 5,742,792 | A | | 4/1998 | Yanai et al. | |
| 5,778,394 | A | | 7/1998 | Galtzur et al. | |
| 5,845,147 | A | | 12/1998 | Vishlitzky et al. | |
| 5,857,208 | A | | 1/1999 | Ofek | |
| 7,073,024 | B1 | | 7/2006 | Chilton | |
| 7,315,976 | B2 | * | 1/2008 | Holt | 714/769 |
| 7,657,718 | B1 | | 2/2010 | LeCrone et al. | |
| 7,734,884 | B1 | | 6/2010 | Marshak et al. | |
| 8,266,499 | B2 | * | 9/2012 | Lincoln | 714/758 |
| 8,307,271 | B1 | * | 11/2012 | Liu et al. | 714/807 |
| 8,341,460 | B2 | * | 12/2012 | Desai et al. | 714/6.3 |
| 2003/0145270 | A1 | * | 7/2003 | Holt | 714/766 |
| 2006/0248245 | A1 | * | 11/2006 | Ninomiya et al. | 710/68 |
| 2008/0250297 | A1 | * | 10/2008 | Chung et al. | 714/758 |
| 2009/0112823 | A1 | * | 4/2009 | Aharonov et al. | 707/3 |
| 2009/0183056 | A1 | * | 7/2009 | Aston | 714/799 |

OTHER PUBLICATIONS

T.V. Ramabadran and S. S. Gaitonde, "A Tutorial on CRC Computations," *IEEE Micro*, vol. 8, issue 4, Aug. 1988, pp. 62-75.
U.S. Appl. No. 12/586,097, filed Sep. 17, 2009, Zhi-Gang Liu et al.

* cited by examiner

*Primary Examiner* — Justin R Knapp
(74) *Attorney, Agent, or Firm* — Muirhead and Saturnelli, LLC (57) ABSTRACT

A block CRC based fast data hash provides efficient data integrity verification functions. A hash word is generated from block CRCs that are stored along with data blocks in a hard drive for each data and/or parity track of a storage system, such as a RAID array. Each storage system member writes the hash word into a global memory. Thereafter, a director verifies data integrity using all member's hash words with one or more XOR operations. Use of the hash words for data integrity verification saves system bandwidth and CPU processing resources.

18 Claims, 11 Drawing Sheets

DIF-CRC BASED FAST HASHING

TECHNICAL FIELD

The present application relates to the field of data storage for computers and, more particularly, to error detection and data integrity verification for data on a storage device.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass., and reference is made to disclosures in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

A cyclic redundancy check (CRC) is an error-detecting code used in connection with storing and/or transmitting data blocks. A CRC-enabled sending/storing device calculates a short, fixed-length binary sequence, known as the CRC code, or just the CRC, for each block of data and sends or stores/embeds the CRC with the data block. When the data block is read or received in connection with data transmission or scanning, the reading/receiving device repeats the CRC calculation and performs a comparison (e.g., an XOR operation); if the new CRC does not match the one calculated earlier, or otherwise indicates an inconsistency, then the data block contains a data error and the reading/receiving device may take corrective action such as rereading or requesting that the data block be sent again. In some cases, it may also be possible to correct the data, for example using an error correcting code (ECC), such as forward error correction (FEC) information, stored in connection with the data. The CRC may be 16-bit protection word provided to ensure data integrity per data block in data interchange format (DIF). The computation of the CRC may resemble a long division operation in which the quotient is discarded and the remainder becomes the result, although the arithmetic used is carry-less arithmetic of a finite field. For a general discussion of CRC computations, reference is made to Ramabadran et al., "A Tutorial on CRC Computations," IEEE Micro, Vol. 8, Issue 4, 1988, pp. 62-75, which is incorporated herein by reference.

Data may be stored in a storage array, such as a redundant array of independent disks (RAID) system, in which the data may be mirrored, striped or otherwise distributed across multiple disk drives or storage devices. RAID is a known technology that provides increased storage functions and reliability through redundancy by combining multiple disk drive components into a logical unit and where data is distributed across the drives in one of multiple ways referred to as RAID levels. Various RAID levels and systems may be used in connection with providing various levels of data reliability, redundancy and I/O performance, using such features as data stripping, mirroring and the use of parity information, among other technologies, as further discussed elsewhere herein. A RAID system may provide for verification of stored data validity using a parity disk drive containing a parity array in which is stored the result of XOR operations of multiple data blocks, or portions thereof, stored in other disk drives of the RAID system. It is known that a CRC may be stored/transmitted together with parity information associated with distributed data blocks in a RAID system, and a CRC associated with each of the received data blocks may be determined and compared with the CRC transmitted with the parity information. Reference is made to, for example, U.S. Pat. No. 7,073,024 to Chilton entitled "Data Protection Method Wherein Data Protection Code is Stored Together With Parity," which is incorporated herein by reference.

In a storage device, a CPU transfer mode may be provided to allow the CPU to move data between memories, such as a global memory and local control storage spaces for global memory stored locally to the CPU. For I/O data in DIF format, the CPU may check each data block's CRC to verify its integrity. Furthermore, data scrubbing is an error correction technique that involves periodic inspection, including use of CRCs, of a storage array, e.g., a RAID array, for errors and then correction of the errors using an ECC or another copy of the data. Data scrubbing may be performed on a sector by sector basis of the storage array and, in known systems, may involve the transmission and storing of the striped data for a sector being evaluated to a global memory of the array in order to be verified using the CRCs and/or corrected using stored parity information. In cases of storage array scanning with data scrubbing and/or integrity verification of data transmission, known CRC verification algorithms may involve substantial processing requirements corresponding to the amount of data scanned or transferred. As an example, for a 64K Read-Hit benchmark, known CRC computing and verification may consume 60% (or even higher) of total CPU cycles.

Accordingly, it would be desirable to provide a system that performs operations for error detecting and integrity verification, e.g., in connection with a RAID integrity scan, faster and more efficiently.

SUMMARY OF THE INVENTION

According to the system described herein, a method for data integrity verification includes identifying a data segment for integrity verification, in which the data segment includes user data and a plurality of error detecting codes corresponding to the user data, and wherein the data segment is stored across multiple disk drives of a storage system. A first operation is performed on the data segment that packs the plurality of error detecting codes into an error detecting code pack, wherein the error detecting code pack is smaller than the data segment. The error detecting code pack is used to verify data integrity of the data segment without reading the data segment. Using the error detecting code pack to verify data integrity may include performing a second operation on the error detecting code pack to generate at least one hash word that is used for data integrity verification, wherein the at least one hash word has a smaller size than the error detecting code pack. The second operation may include a 32 bit polynomial hash operation. The multiple disk drives may be part of a redundant array of independent disks (RAID) storage system, and identifying the data segment for integrity verification may include performing a RAID integrity scan. Each of the error detecting codes may be a data interchange format-cyclic redundancy check (DIF-CRC) code. The data segment may be a data segment of a fixed block architecture system and/or of a count key data architecture system. Verifying data integrity may include storing the error detecting code pack and comparing the error detecting code pack to information corresponding to stored parity information and/or verifying data integrity may include storing the at least one hash word and comparing the at least one hash word to information corresponding to stored parity information. The data segment may include format data, and the method may further include after performing the first operation on the error detecting code pack, neutralizing each of the error detecting codes in the error detecting code pack to generate error detecting codes for which the format data is removed.

According further to the system described herein, a non-transitory computer readable medium stores software for data integrity verification. The software includes executable code that identifying a data segment for integrity verification, wherein the data segment includes user data and a plurality of error detecting codes corresponding to the user data, and wherein the data segment is stored across multiple disk drives. Executable code is provide that performs a first operation on the data segment that packs the plurality of error detecting codes into an error detecting code pack, wherein the error detecting code pack is smaller than the data segment. Executable code uses the error detecting code pack to verify data integrity of the data segment without reading the data segment. The executable code that uses the error detecting code pack to verify data integrity may include executable code that performs a second operation on the error detecting code pack to generate at least one hash word that is used for data integrity verification, wherein the at least one hash word has a smaller size than the error detecting code pack. The second operation may include a 32 bit polynomial hash operation. The multiple disk drives may be part of a redundant array of independent disks (RAID) storage system, and identifying the data segment for integrity verification may include performing a RAID integrity scan. Each of the error detecting codes may be a data interchange format-cyclic redundancy check (DIF-CRC) code. The data segment may be a data segment of a fixed block architecture system and/or of a count key data architecture system. The executable code that verifies data integrity may include executable code that stores the error detecting code pack and compares the error detecting code pack to information corresponding to stored parity information and/or may include executable code that stores the hash word and compares the hash word to information corresponding to stored parity information. The data segment may include format data, and the software may further include executable code that, after performing the first operation on the error detecting code pack, neutralizes each of the error detecting codes in the error detecting code pack to generate error detecting codes for which the format data is removed.

According further to the system described herein, a system for data integrity verification includes a memory and at least one processor that accesses the memory. The one processor performs functions of: identifying a data segment for integrity verification, in which the data segment includes user data and a plurality of error detecting codes corresponding to the user data, and in which the data segment is stored across multiple disk drives of a storage system; performing a first operation on the data segment that packs the plurality of error detecting codes into an error detecting code pack, in which the error detecting code pack is smaller than the data segment; and using the error detecting code pack to verify data integrity of the data segment without reading the data segment. The multiple disk drives may be included in a redundant array of independent disks (RAID) storage system.

The system described herein provides for data integrity verification of the data stored on the RAID array in connection with a RAID scan (data scrubbing) without having to read or write the data that is striped across the multiple drives into a global memory.

BRIEF DESCRIPTION OF THE DRAWINGS

Embodiments of the system described herein are explained below in detail with reference to the several figures of the drawings that are briefly described as follows.

DETAILED DESCRIPTION OF VARIOUS EMBODIMENTS

Figure 1:
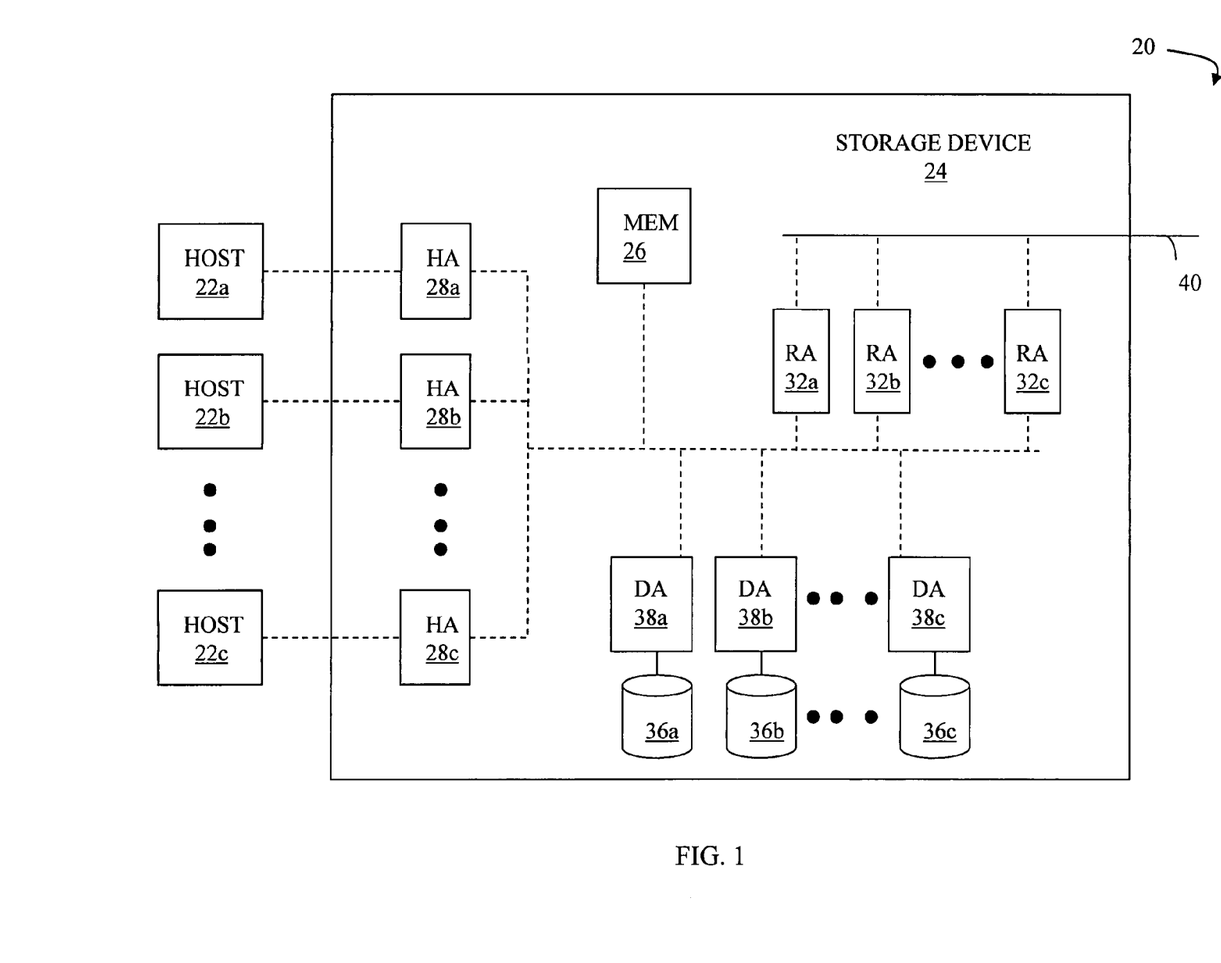
FIG. 1 is a schematic diagram showing a plurality of hosts and an example of a data storage device that may be used in connection with the system described herein.

FIG. 1 is a schematic diagram 20 showing a plurality of hosts 22a-22c coupled to a data storage device 24. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. The storage device 24 may also include one or more other adapters, such as Remote Data Facility (RDF) adapter units (RA's) 32a-32c that may be used in connection with an RDF product, such as produced by EMC Corporation of Hopkinton, Mass., to copy data from one storage device to another, as further discussed elsewhere herein. The storage device 24 may communicate with other storage devices via a communication link 40.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span the disks 36a-c. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and/or the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Features and functions of the memory 26 are further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable medium and executed by one or more processors.

Figure 2:
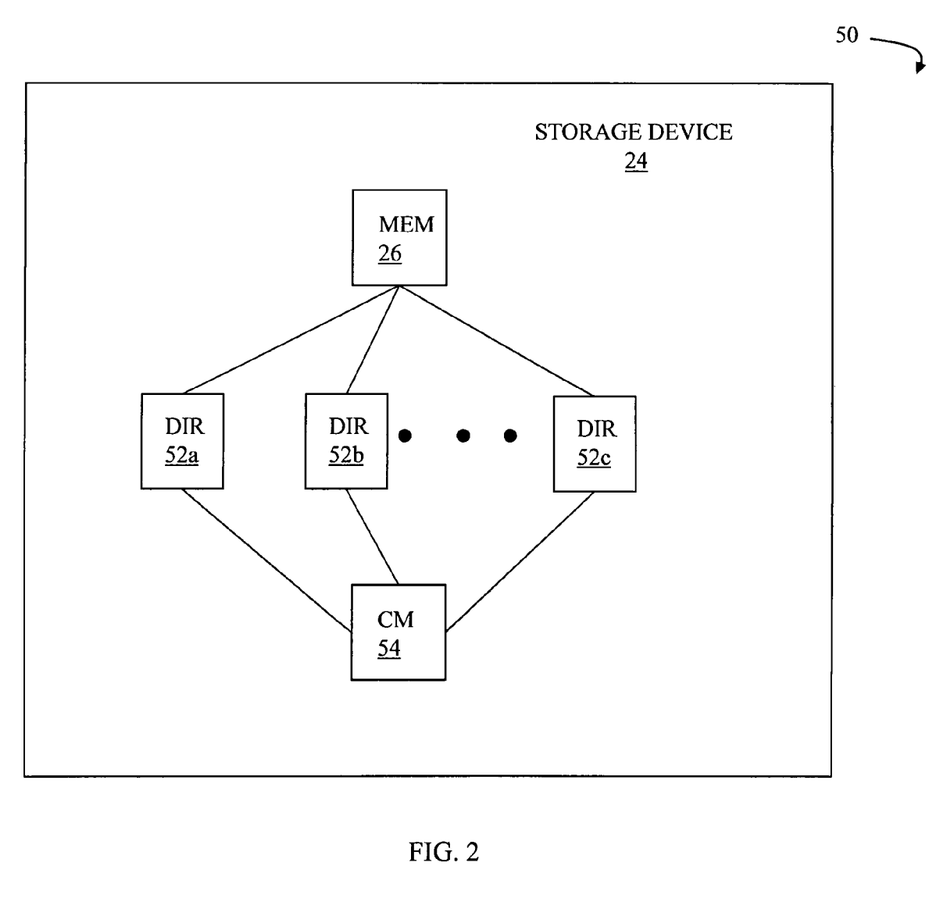
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the directors 52a-52c.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

The system described herein may be used in connection with data integrity verification for a RAID array scan (data scrubbing) or where otherwise desirable to perform data integrity verification operations on data blocks stored or transferred within or between storage devices. As further discussed elsewhere herein, a CRC-enabled sending/storing device may calculate a short, fixed-length binary sequence (the CRC) for each block of data and may send or store/embed the CRC with the data block. When the data block is read or received, the reading/receiving device repeats the calculation using a comparison operation (e.g., an XOR operation); if the new CRC does not match the one calculated earlier, or otherwise indicates an inconsistency, then the data block contains a data error and the reading/receiving device may take corrective action such as rereading or requesting the data block be sent again. In some cases, forward error correction (FEC) techniques may be used so that the data may be repaired in situ.

As previously noted, with known techniques for verification CRC computations, particularly with DIF-CRC, the verification CRC computations may significantly slow down data transfer rates and/or the rate of scrubbing. In addition, in the case of scrubbing, there may be a trade-off related to the amount of bandwidth used for scrubbing and the scrubbing cycle time. If the cycle time is too short, then the bandwidth used for scrubbing may be too high and normal operation of the system may be adversely impacted. On the other hand, if the cycle time is too long, then corrupted data may be not repaired in a suitable time. The system described herein addresses these issues and provides for faster and more efficient data verification for error detecting and related verification operations. It is noted that the system described herein may also operate in connection with the system and features described in U.S. Pat. No. 8,307,271 to Zhi-Gang Liu et al, entitled "Fast Verification of Data Block Cyclic Redundancy Checks," which is incorporated herein by reference.

Figure 3:
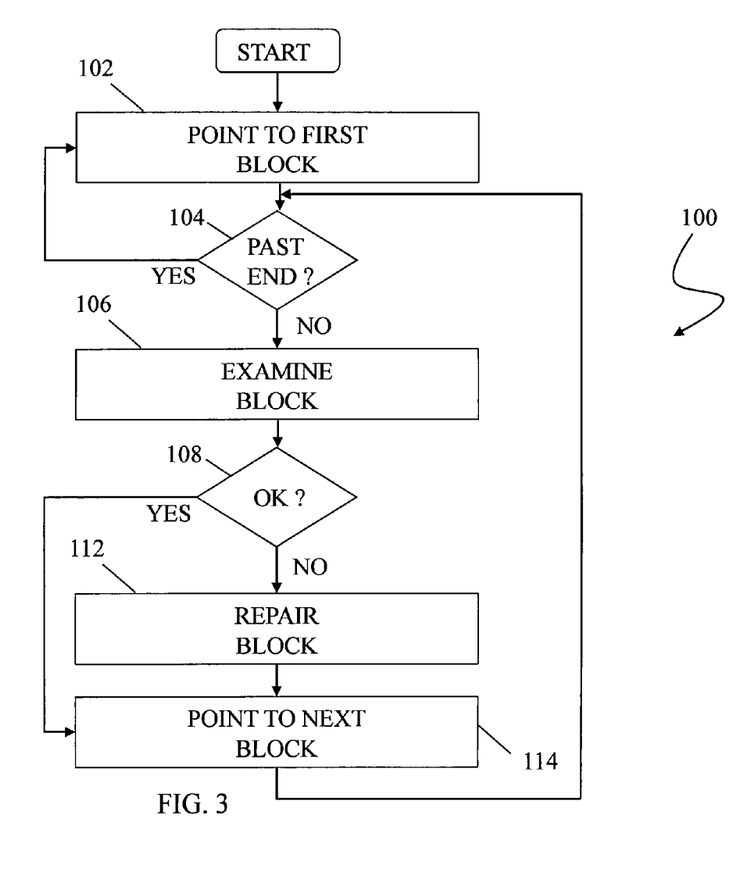
FIG. 3 is a flow diagram showing storage device scrubbing according to an embodiment of the system described herein.

FIG. 3 is a flow diagram 100 illustrating steps performed in connection with a storage device scrubbing. Processing begins at a first step 102 to initialize a pointer that iterates through all of the locations of the storage device (or possibly just all of the active locations containing data). Following the step 102 is a test step 104 where it is determined if the pointer that iterates through all of the blocks of data of the storage device points past the end of the data (i.e., has iterated through all of the blocks of data). If so, then control passes back to the step 102 to reinitialize the pointer. The steps 102, 104 represent a loop that iterates through all of the data of the storage device.

If it determined at the test step 104 that the iteration pointer does not point past the end, then control passes from the test step 104 to a step 106 where the block of data corresponding to the iteration pointer is examined to determine if the block is OK (i.e., not corrupted). The specific examination performed at the step 106 depends upon the type of storage as well as the type of error correction/detection system being used. In an embodiment herein, RAID stripping may be used with corresponding Forward Error Correction (FEC) codes. As discussed in more detail elsewhere herein, the processing performed at the step 106 may minimize the amount of data that needs to be read into memory.

Following the step 106 is a test step 108 where it is determined if the result of the examination at the step 106 indicates that the block pointed to by the iteration pointer is OK (e.g., not corrupted). If not, then control transfers from the test step 108 to a step 112 where the block is repaired. The specific mechanism to repair the block at the step 112 is implementation dependent, but could including rebuilding the block of RAID data using RAID parity information. Following the step 112 is a step 114 where the iteration pointer is incremented. Note that the step 114 is also reached from the step 108 if the examined block is OK. Following the step 114, control transfers back to the step 104 for another iteration.

Figure 4A:
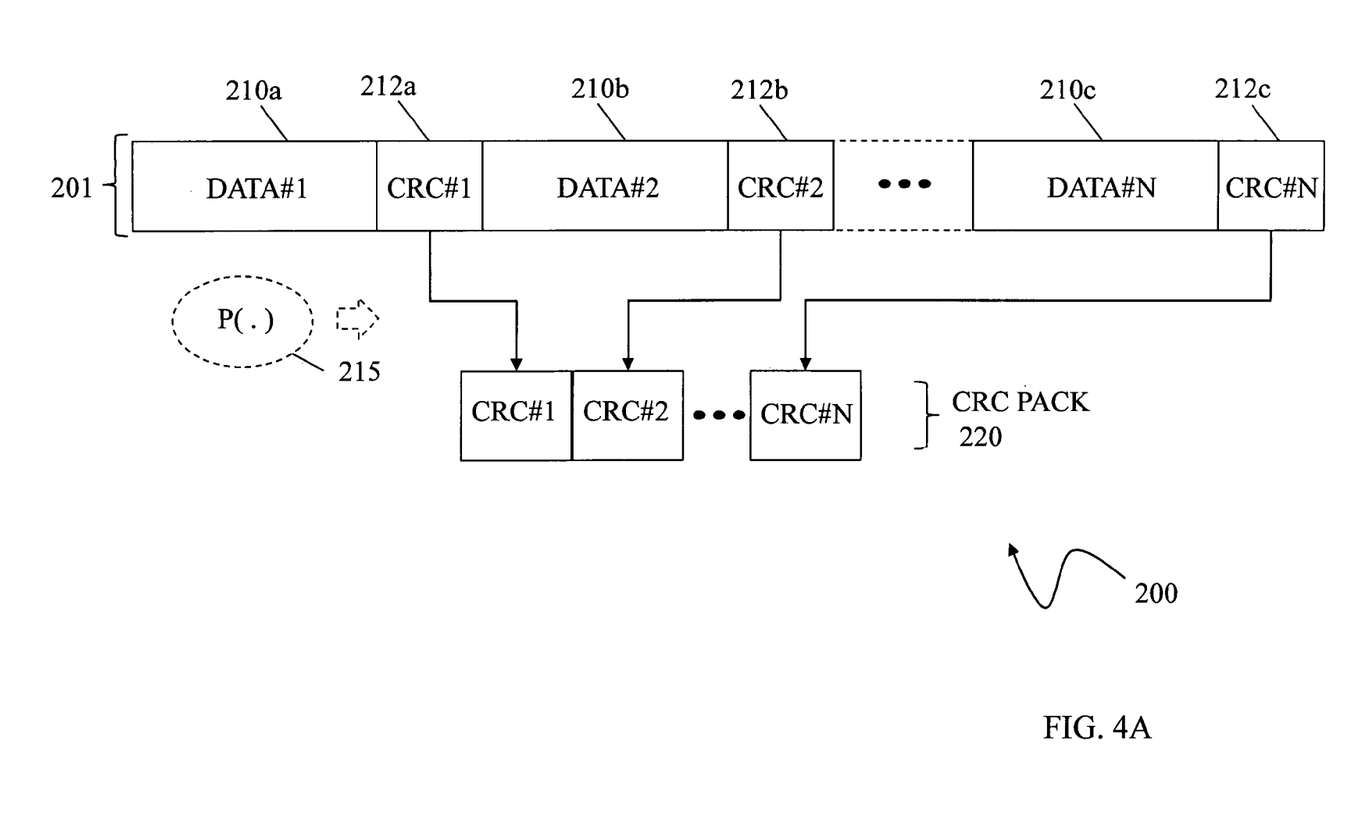
FIGS. 4A and 4B are schematic diagrams of CRC and/or hashing operations performed in connection with data verification according to various embodiments of the system described herein.

FIG. 4A is a schematic diagram of a system 200 for performing data verification operations according to an embodiment of the system described herein. The system 200 includes a data track 201, and/or other designation or type of data set, that includes data blocks DATA#1-#N 210a, 210b, 210c and corresponding CRCs #1-#N 212a, 212b, 212c computed for and embedded with each of the data blocks 210a-c. The operations may be performed by one or more of the directors 38a-38c of the storage device 24. In an embodiment, the data track 201 may have a size of 64K. The system described herein may operate in connection with fixed-size data blocks; however, in other embodiments, data blocks having variable lengths may also be used. Accordingly, the system described herein may be used in connection with fixed block architecture (FBA) devices and count key data (CKD) devices and/or other appropriate disk storage architectures. In an embodiment, FBA format data size may be 512 or 520 bytes. In another embodiment, CKD format data size may be 512 bytes. Each data block (FBA or CKD) may further include an additional 8 bytes of CRC data including a 16-bit DIF-CRC, for example.

As shown in the figure, a first level hash operation (P(•)) 215 is performed on the data track 201 (data track D) that contains data striped across the multiple drives, including parity information. The drives may correspond, for example, to the drives 36a-36c shown in FIG. 1. The first level hash operation (P(•)) 215 determines and packs the CRCs (e.g., 16-bit DIF-CRCs) for each of the data blocks #1-#N to produce a CRC pack 220. In an embodiment, generating the CRC pack 220 may include a processor fetching the CRCs (e.g., 128 fetches per track for FBA or 112 for CKD) from the data track. In other embodiments, it is also possible to re-compute the CRCs for each of the data blocks. In an embodiment, for FBA, the data track 201 may have a size of 64K and the CRC pack 220 may be 256 bytes. In another embodiment, for CKD, the data track 201 may have a size of 56K and the CRC pack 220 may be 224 bytes. Accordingly, the CRC pack 220 is significantly smaller than the data track size. As further discussed elsewhere herein, the CRCs of the data pack may be compared (e.g., XOR'd) and the result matched to the CRC of parity information for the data track 201 to determine whether integrity of the data is verified.

Figure 4B:
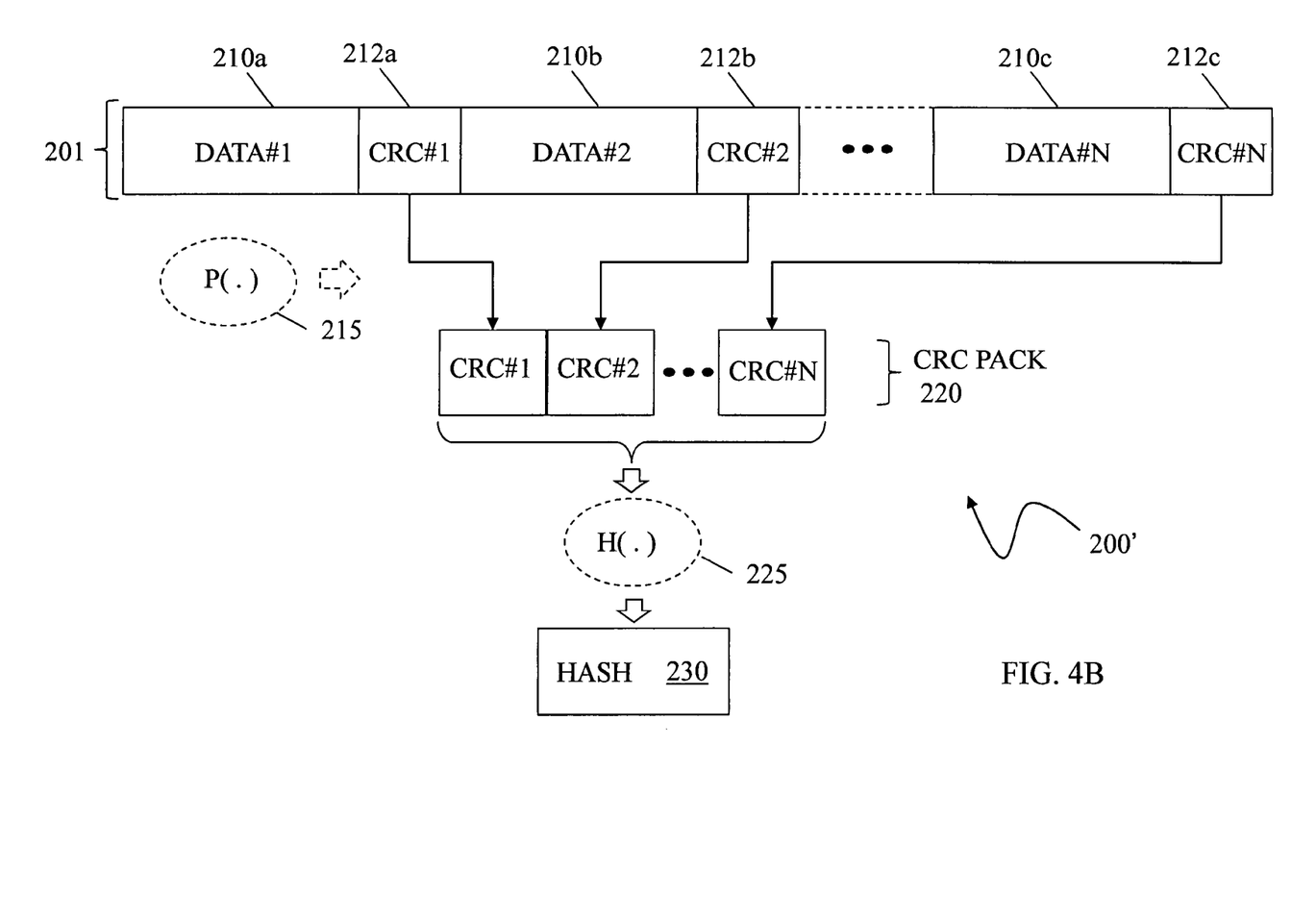

FIG. 4B is a schematic diagram 200' showing another embodiment in which a second level operation (H(•)) 225 may be performed on the CRC pack 220. The operation H(•) 225 may be a hash operation that includes a 32-bit polynomial computation. The 32-bit polynomial computation may be a known computation, such as Ethernet CRC, Ficon CRC32 or iSCSI CRC 32 and/or may be an appropriate privately defined computation. For the operation H(•), and the 32-bit polynomial computation is performed on the fetched 256 (or 224) byte CRC pack 220 per data track. The result is a hash word 230 having a smaller size than the CRC pack 220. For example, the hash word 230 may be a 4 byte hash word. Accordingly, use of the second level operation further reduces the size of the information stored in a global memory in connection with data verification, thereby offering additional advantages is processing requirements in connection with data scrubbing. The H(•) and/or P(•) operations may be performed by one or more of the directors of a storage device and/or any other appropriate processor. As an example, an Intel Core-2 CPU may perform a 256 byte 32-bit polynomial computation in approximately 500 ns.

The computations of the first and second level operations are summarized by the following equations:

data track $D=\{B_1,B_2,B_3\ldots,B_N\}$ where $B_i=\{D_i|CRC_i\}$);

$P(D)=\{CRC_1,CRC_2\ldots CRC_N\}$;

$H(D)$=Polynomial reduction($P(D)$).

It should be noted that, as a mathematical property:

$H(D_i)+H(D_j)=H(D_i+D_j)$+constant

The above-noted operations advantageously reduce bandwidth requirements by reducing an amount of data sent across an internal fabric of a storage system (and/or via a remote data line) for data verification. Instead of sharing data in connection with data verification, for example, by storing the data to a global memory, only the smaller size data (e.g., the CRC pack and/or the hash words) are relayed and used to verify data integrity. Accordingly, each drive of the multiple drives of the RAID system on which data has been striped may perform the packing and/or hashing operations and the results thereof sent to a global memory to be verified by a director of a storage device. The entire data of the data track does not need to be transmitted to the global memory to perform data integrity verification, and thus CPU computation costs are reduced. For example, to process an FBA data track, a CPU may only require approximately 2 µs to determine the hash word, which includes the time to fetch data from memory to CPU cache as well as the polynomial reduction H(•) operation.

Figure 5A:
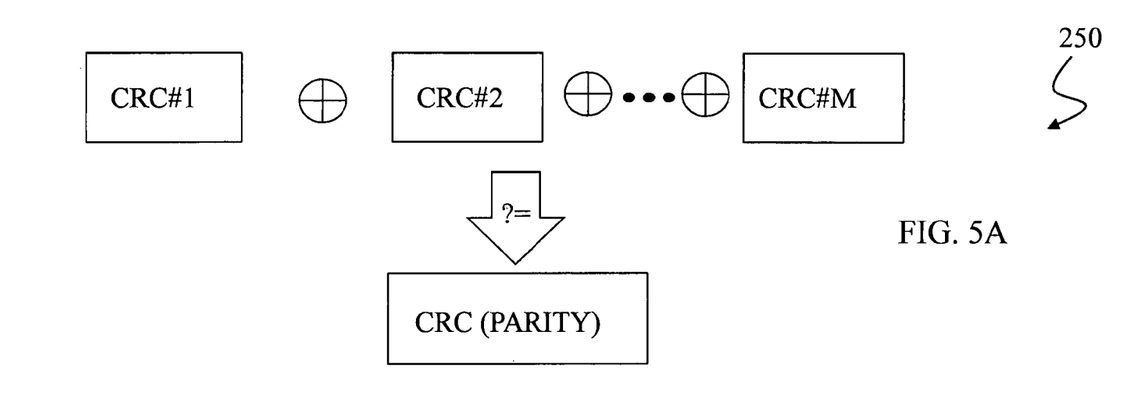
FIGS. 5A and 5B are schematic diagram showing data integrity verification operations using the results of FIGS. 4A and 4B according to various embodiments of the system described herein.

FIGS. 5A and 5B are schematic diagrams showing data integrity verification operations for a storage system according to embodiments of the system described herein. In FIG. 5A, a schematic diagram 250 shows the XOR comparison of CRCs (CRC#1-CRC#M) of the CRC pack obtained for each data block of the data track being verified. The CRCs of the CRC pack may be stored in a global memory of the RAID array, as further discussed elsewhere herein, rather than storing the entire data of the track being verified in the global memory. The result of this operation may be compared to a CRC of parity information stored for the data. The comparing operations may be performed by one or more directors of the RAID array. If the CRC of the parity information matches the XOR result of the CRCs from the CRC pack for the user data, then it may be determined that data integrity is verified. If not, then error detection and/or correction operations may be performed on the data track. As discussed elsewhere herein, error correction may include using error correction codes, such as FEC codes, from the parity information and/or may include re-transmitting or re-copying data.

Figure 5B:
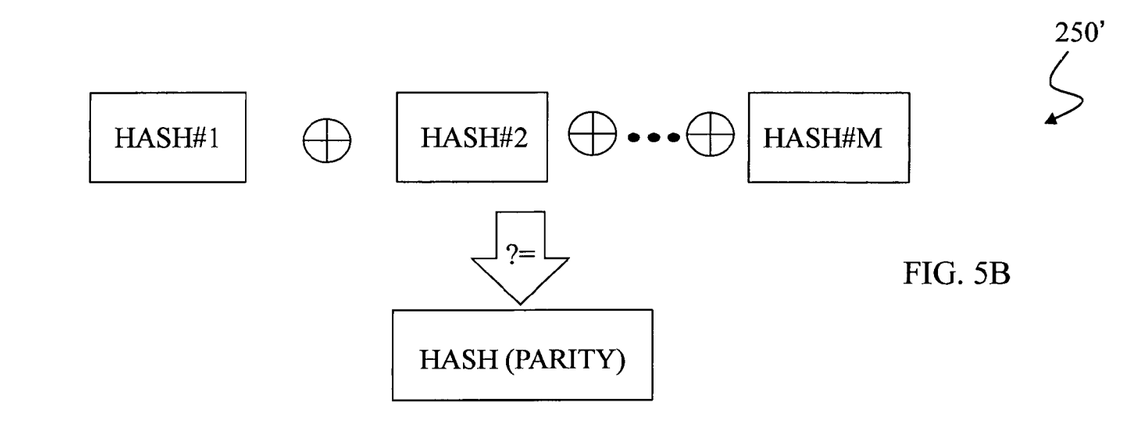

FIG. 5B is a schematic diagram 250' showing another embodiment for data integrity verification operations according to the system described herein. The diagram 250' shows use of hash words, using the H(•) operation, generated for one or more tracks in the storage system and stored in global memory, as further discussed elsewhere herein. The hash words HASH#1-M may be generated according to the system described herein corresponding to one or more tracks of a disk and/or device and verified using an XOR operation by one or more of the directors of the RAID array. If the result of the XOR operation of the hash words matches the hash of the parity information for the subject data, data integrity may be determined as verified. If not, then the data is determined to be in error and may be corrected using, for example, error correction codes of the parity information according to an embodiment of the system described herein.

Accordingly, the system described herein may efficiently verify data integrity among the member devices, e.g., RAID member devices including data drives and/or parity drives, using the hash words and may advantageously avoid writing and reading the member devices' data to/from a global memory. In an embodiment, the system described herein may reduce fabric bandwidth and CPU XOR calculations by as much as 1−1/64=98.4%. It is particularly noted that the system described herein provides for data verification, using the CRC pack and/or hash words, without having to copy the subject data into a global memory or otherwise having to read or examine an entire copy of the subject data.

Figure 6:
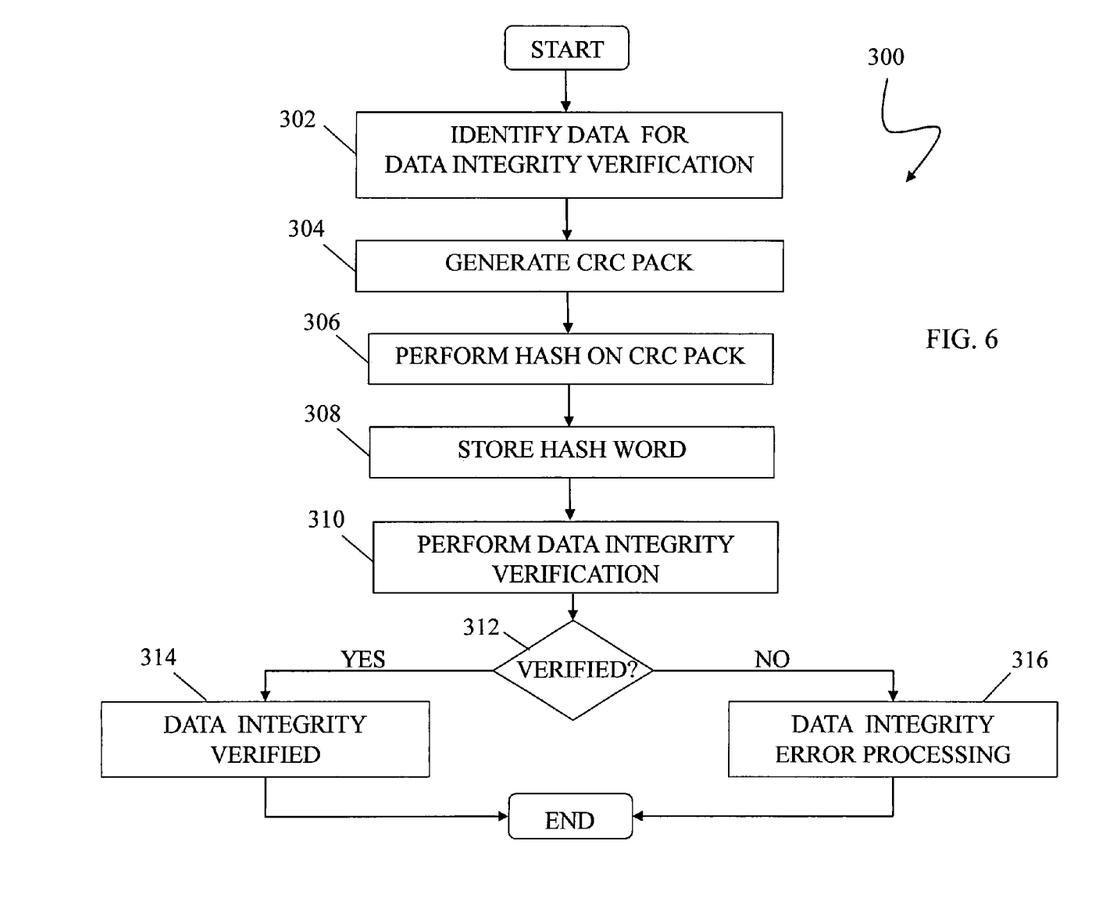
FIG. 6 is a flow diagram showing error detecting and verification processing according to an embodiment of the system described herein.

FIG. 6 is a flow diagram 300 showing error detecting and verification processing according to an embodiment of the system described herein. At a step 302, data for which data verification is desired is identified, such as identification of data on a data track. The data track may include data segments that include user data blocks and corresponding CRC's computed for each of the data blocks. The data blocks may have fixed lengths, e.g., in connection with an FBA device, such the data segment is 512 byte data that includes the user data block and the CRC, such as a 16 bit DIF-CRC. As further discussed elsewhere herein, however, the system described herein may be used in connection with data blocks have variable sizes as used, for example, in CKD devices. After the step 302, processing proceeds to at a step 304 at which a first level operation (P(•)) is performed to determine a CRC pack that includes the computed CRCs for each of the data blocks. For example, for a data track of 64K, the CRC pack may be 256 bytes (i.e. for 128 data blocks).

After the step 304, processing proceeds to at a step 306 where a second level operation (H(•)) is performed on the CRC pack. The H(•) operation may be a 32-bit polynomial reduction computation performed on the CRC pack and generates a hash word. For example, the hash word may be a 4 byte hash word. Accordingly, the 64K data track has been reduced to one or more 4 byte hash words for data integrity verification purposes. After the step 306, processing proceeds to a step 308 where the hash word is stored in a global memory of the storage system, for example, in the global memory of one or more of the storage devices. Note that, in the case of a RAID array where each of the disks 36a-36c correspond to one of the data or parity elements, then the processing performed in connection with the steps 302, 304, 306, 308 may be provided locally one of the corresponding ones of the directors 38a-38c, without having to transfer the data to the global memory 26 prior to obtaining the hash word at the step 308.

After the step 308, processing proceeds to a step 310 where data integrity processing is performed using the stored hash word. For example, the hash word may be XOR'd with other stored hash words corresponding to the data being verified and the result matched against one or more stored hash words of parity information for the subject data being verified. It is noted that in various embodiments multiple hash words may be stored corresponding to multiple data tracks before performing the data integrity processing of the step 310. The processing performed at the step 310 may correspond to the block examination step 106, discussed above. Note the processing performed at the step 310 does not require reading all of the data but, instead, only the hash words need to be used. Thus, for example, if the data integrity check at the step 310 were being performed by one of the directors 28a-28c, 38a-38c of the storage device 24 by reading data into global memory 26, the ability to check the hash words (or CRCs) instead of needing to check all of the data greatly reduces the amount of data that needs to be transferred to the global memory 26.

After the step 310, processing proceeds to a test step 312 where it is determined whether data integrity of the subject data has been verified based on the comparison operation. If so, then processing proceeds to a step 314 that indicates data integrity has been verified. After step 314, processing is complete. If, at the test step 312, it is determined that there is a data integrity error, then processing proceeds to a step 316 where data integrity error processing is performed. Data integrity error processing may include requesting re-transmission or re-copying of data that is determined to be corrupted and/or performing data correction in situ, for example using FEC processing or other type of error correction code processing in connection with a data scrubbing process. As further discussed elsewhere herein, it is noted that in another embodiment, it is possible for the CRC pack may be used in connection the data integrity operations without performing the second operation. After step 316, processing is complete.

The system described herein may be used in connection with CKD devices. A CKD device data track may include, in addition to the user data and the computed CRC, extra format data for each data block, such as physical address information, a time stamp, a cache address, and/or other information about the user data. The format data is not part of the user data but may be included in the computation of the CRC, e.g., the computed DIF-CRC. Accordingly, in an embodiment, the system described herein may be used to verify data integrity on a CKD device but with an additional neutralization operation. The neutralization operation logically removes the contribution of the format data from the CRC that will be included used in the generation of the hash word. That is, after the neutralization operation, hash words of the source and destination data for a CKD may be compared in the data verification processing step.

Figure 7:
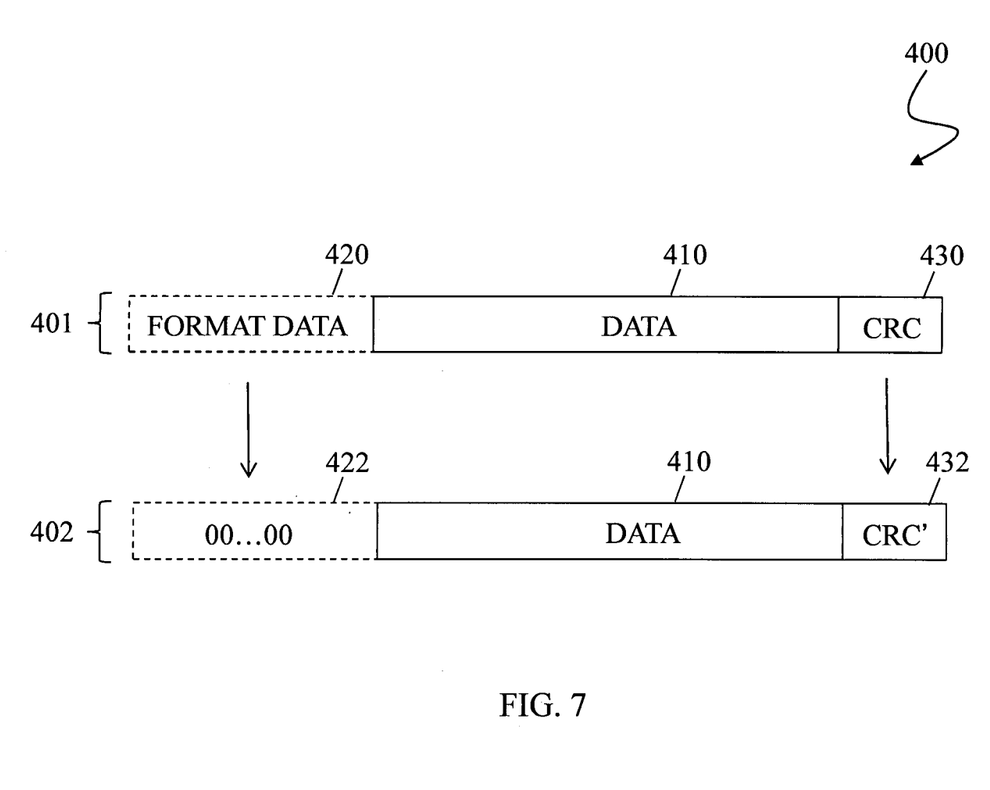
FIG. 7 is a schematic illustration showing neutralization operations for a CKD device according to an embodiment of the system described herein.

FIG. 7 is a schematic illustration 400 showing neutralization operations for a CKD device according to an embodiment of the system described herein. A data segment 401 of a track on a CKD device includes a user data block 410 and format data 420. A CRC 430 is computed from both the user data 410 and the format data 420. In an embodiment, the data segment 401 may be 520 bytes and the CRC 420 may be a 16 bit DIF-CRC. Data segment 402 shows a neutralized data segment in which the portion of the segment 402 that corresponded to the format data has been neutralized, for example, by being overwritten as all zeroes 422. The user data 410 has not changed. A new CRC, CRC' 432, is then computed using the neutralized format data section 422. It may be noted that the data on the data track may be not altered, rather, the data segment 402 and/or any other neutralization information is stored and accessed elsewhere in connection with data integrity verification operations. Accordingly, the original format data and CRC for each data segment, as well as the original user data, is maintained on the data track.

Figure 8:
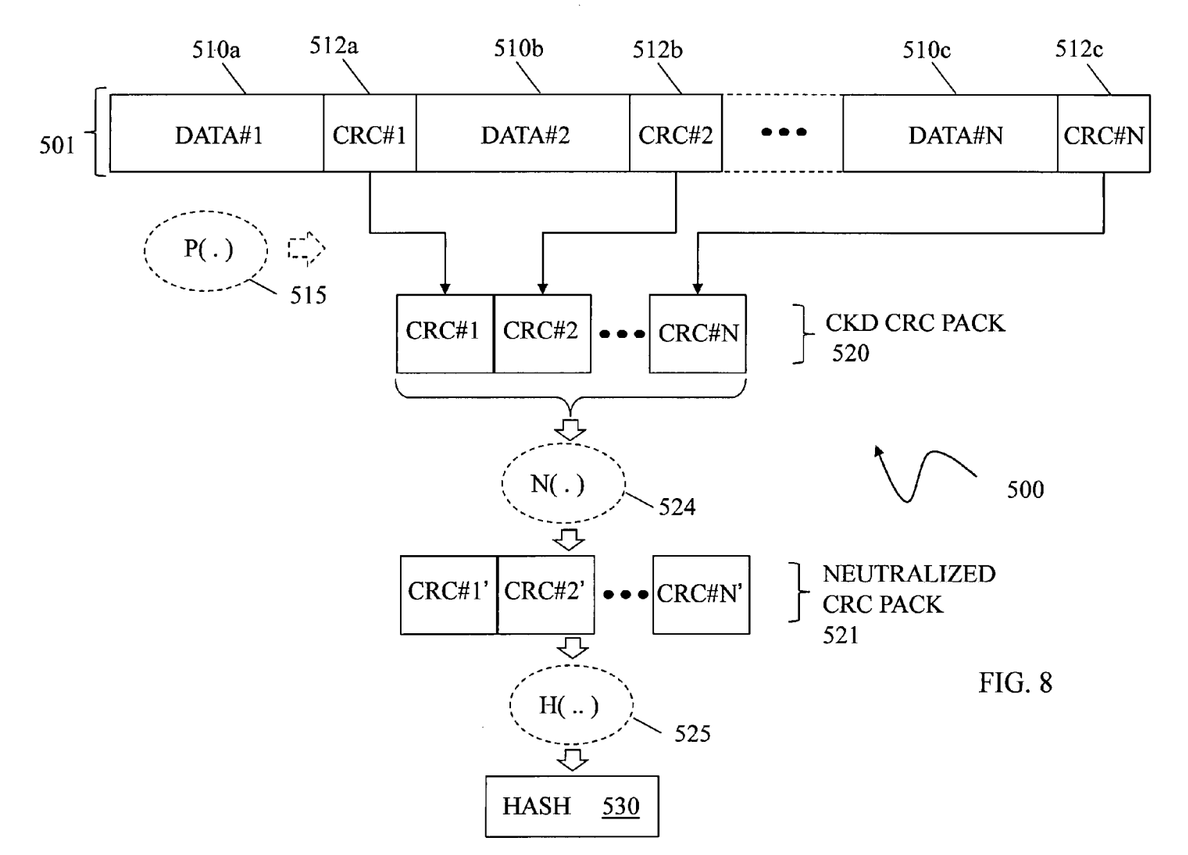
FIG. 8 is a schematic illustration showing the neutralization operations in connection with data verification processing in accordance with an embodiment of the system described herein.

FIG. 8 is a schematic illustration 500 showing the neutralization operations in connection with data verification processing in accordance with an embodiment of the system described herein. A CKD data track 501, and/or other appropriate designation or type of data set, is shown that includes data blocks DATA#1-#N 510a-c and corresponding CRCs #1-#N 512a-c computed for and embedded with each of the data blocks 510a-c. A first level operation (P(•)) is performed to determine a CKD CRC pack 520. The CKD CRC pack 520 is determined by packing the CRCs 512a-c for the data track 501. In accordance with the system described herein, a neutralization process (N(•)) 524 may then be performed on the CKD CRC pack to generate a neutralized CRC pack 521 that includes neutralized CRCs: CRC#1'-#N'. It is noted that the neutralization process (N(•)) 524 may be performed on the CKD CRC pack 520 but not on the data track 501 CRCs, such that the original CKD CRCs, and format data, are maintained on the data track 501.

In an embodiment, comparison of the neutralized CRC pack 521 may be made with respect to a CRC of parity information for the subject data to verify data integrity, in a manner like that further discussed elsewhere herein. Additionally, in another embodiment, a second level operation (H(•)) 525 may then be performed on the neutralized CRC pack 521. As further discussed elsewhere herein, the operation H(•) 525 may be a hash operation that includes a 32-bit polynomial computation. For the operation H(•), a processor fetches each block CRC from the neutralized CRC pack 521 (112 blocks for CKD), and the 32-bit polynomial computation is performed on the fetched 224 byte CRC words per data track. The result is a reduced hash word 530, for example, a 4 byte hash word. The hash word may be stored in used in data integrity verification operations in connection with other hash words stored for data tracks of other member devices, as further discussed elsewhere herein.

Figure 9:
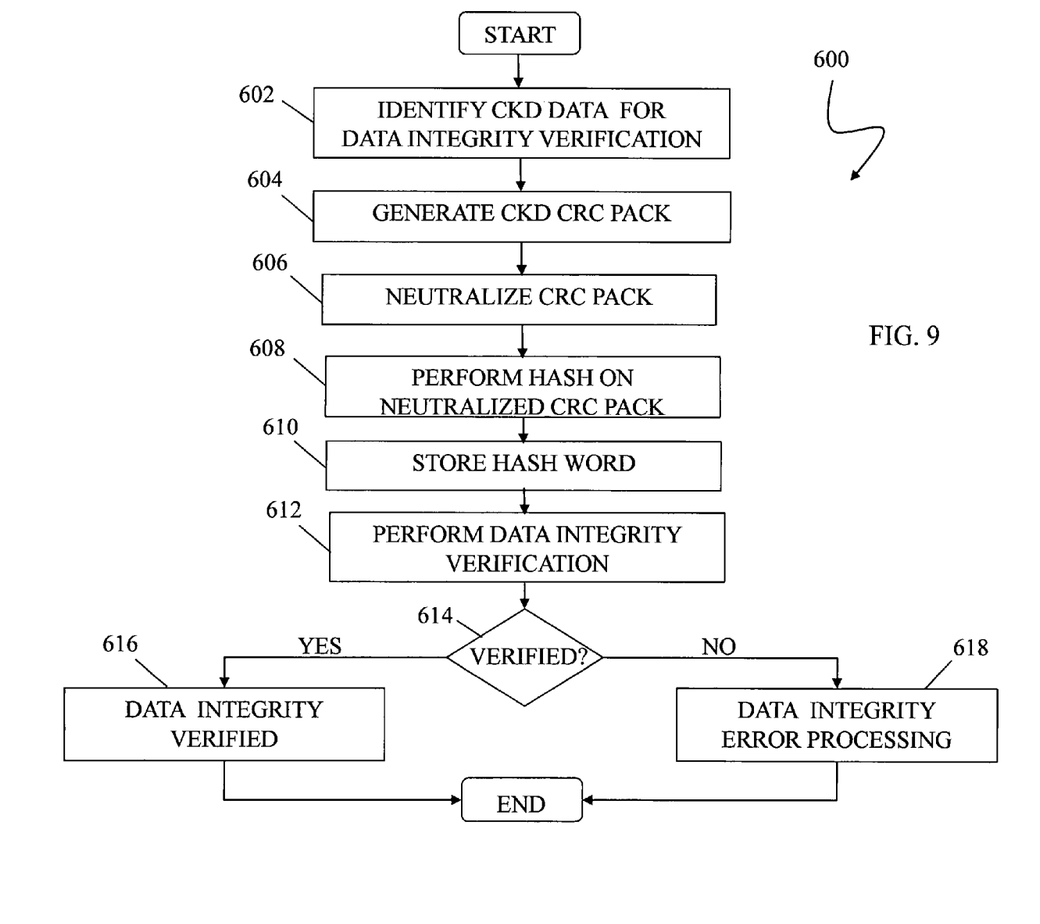
FIG. 9 is a flow diagram showing error detecting and verification processing for a CKD device according to an embodiment of the system described herein.

FIG. 9 is a flow diagram 600 showing error detecting and verification processing for a CKD device according to an embodiment of the system described herein. At a step 602, data for which data verification is desired is identified, such as identification of data on a CKD data track. The data track may include data segments that include user data blocks, CKD format data, and corresponding CRC's computed for each of the data blocks. The data blocks may have fixed lengths, e.g., in connection with an CKD device, such the data segment is 520 byte data that includes the user data block, the CRC (such as a 16 bit DIF-CRC), and the CKD format data. After the step 602, processing proceeds to at a step 604 at which a first level operation (P(•)) is performed to determine a CKD CRC pack that includes the computed CKD CRCs for each of the data blocks. For example, for a data track of 56K, the CKD CRC pack may be 224 bytes (i.e. for 112 data blocks).

After the step 604, processing proceeds to at a step 606 where a neutralization operation (N(•)) is performed on the CKD CRC pack to generate a neutralized CRC pack. As further discussed elsewhere herein, the neutralization process removes format data from each CKD data segment and re-computes the CRC. After the step 606, processing proceeds to a step 608 where a second level operation (H(•)) is performed on the neutralized CRC pack. The H(•) operation may be a 32-bit polynomial reduction computation performed on the neutralized CRC pack and generates a hash word. For example, the hash word may be a 4 byte hash word. Accordingly, the 56K data track has been reduced to a 4 byte hash word. After the step 608, processing proceeds to a step 610 where the hash word is stored in a global memory of the storage system, for example, in the global memory of one or more of the storage devices. Note that, in the case of a RAID array where each of the disks 36a-36c correspond to one of the data or parity elements, then the processing performed in connection with the steps 602, 604, 606, 608, 610 may be provided locally one of the corresponding ones of the directors 38a-38c, without having to transfer the data to the global memory 26 prior to obtaining the hash word at the step 610.

After the step 610, processing proceeds to a step 612 where data integrity processing is performed using the stored hash word. For example, the hash word may be XOR'd with other stored hash words corresponding to the data being verified and the result matched against one or more stored hash words of parity information for the subject data being verified. It is noted that in various embodiments multiple hash words may be stored corresponding to multiple data tracks before performing the data integrity processing of the step 612. The processing performed at the step 612 may correspond to the block examination step 106, discussed above. Note the processing performed at the step 612 does not require reading all of the data but, instead, only the hash words need to be used. Thus, for example, if the data integrity check at the step 612 were being performed by one of the directors 28a-28c, 38a-38c of the storage device 24 by reading data into global memory 26, the ability to check the hash words (or CRCs) instead of needing to check all of the data greatly reduces the amount of data that needs to be transferred to the global memory 26.

After the step 612, processing proceeds to a test step 614 where it is determined whether data integrity of the subject data has been verified based on the matching operation. If so, then processing proceeds to a step 616 that indicates data integrity has been verified. After step 616, processing is complete. If, at the test step 614, it is determined that there is a data integrity error, then processing proceeds to a step 618 where data integrity error processing is performed. Data integrity error processing may include requesting re-transmission or re-copying of data that is determined to be corrupted and/or performing data correction in situ, for example using FEC processing or other type of error correction code processing in connection with data scrubbing. As further discussed elsewhere herein, it is noted that in another embodiment, it is possible for the CRC pack may be used in connection the data integrity operations without performing the second operation. After step 618, processing is complete.

The system described herein is discussed principally in connection with data integrity verification in connection with a RAID integrity scan (data scrubbing). In other embodiments, the system described herein may also be used in connection with mirrored data comparisons, such as on a RAID array and/or in connection with RDF data comparisons.

Figure 10:
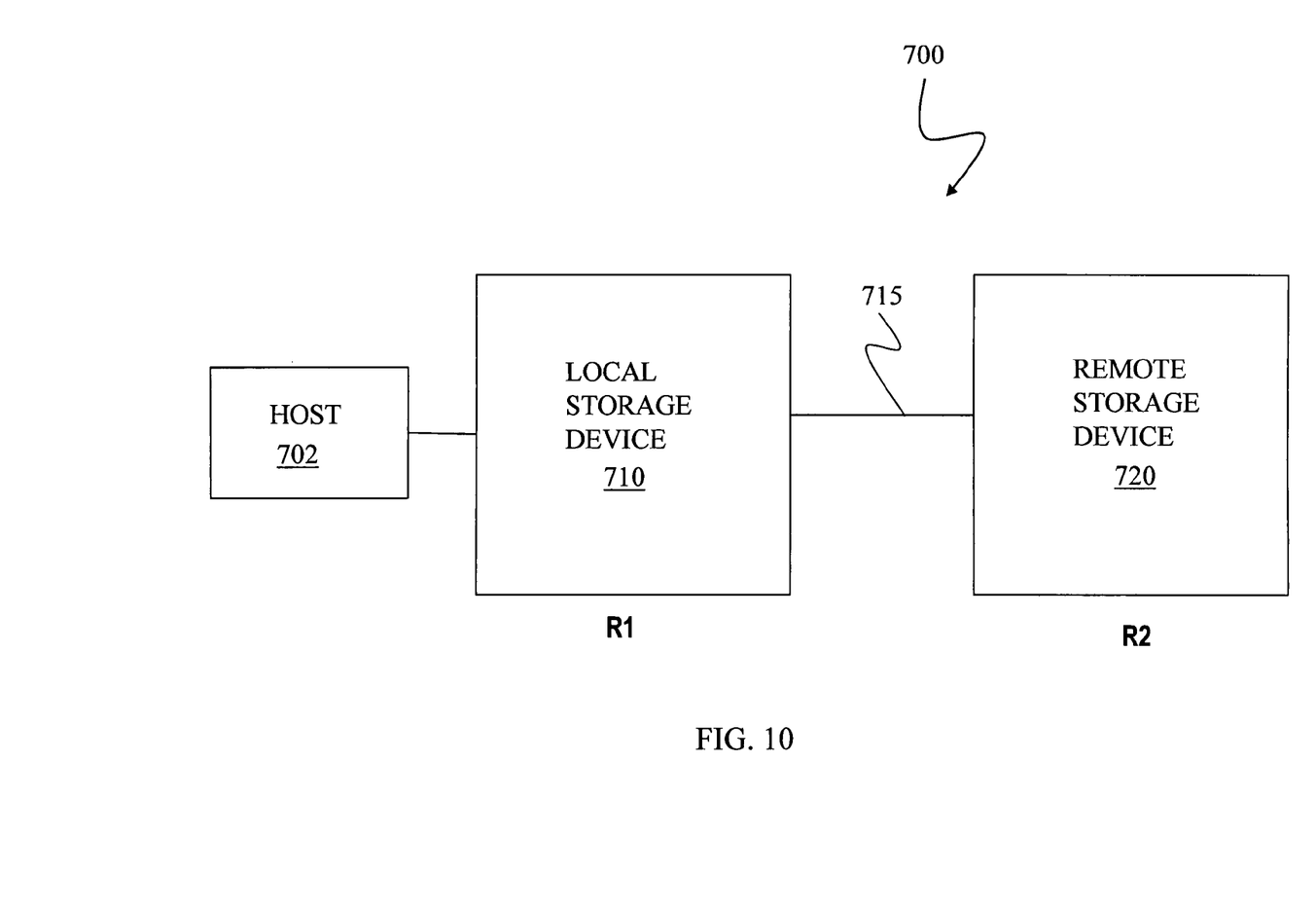
FIG. 10 is a schematic illustration of an RDF storage system that may be used in connection with an embodiment of the system described herein.

FIG. 10 is a schematic diagram showing another example of a storage system 700, e.g., an RDF system, that may be used in connection with data integrity verification according to the system described herein. The storage system 700 may include a local storage device 710 coupled to a remote storage device 720 via a link 715 and may each have similar components as described with respect to the storage device 24 discussed herein and/or may be a different type of storage device. The local storage device 710 and the remote storage device 720 may operate as an RDF product for providing backup and/or mirrored copies of data, as further discussed elsewhere herein, such as a Symmetrix product produced by EMC Corporation of Hopkinton, Mass. Providing an RDF mapping between portions of the local storage device 710 and the remote storage device 720 may involve setting up a logical device on the remote storage device 720 that is a remote mirror for a logical device on the local storage device 710. A host 702, like one or more of the hosts 22a-c, may read and write data from and to the logical device on the local storage device 710, and the RDF mapping causes modified data to be transferred from the local storage device 710 to the remote storage device 720.

In steady state operation, the logical device on the remote storage device 720 may contain data that is a copy of, or at least substantially identical to, the data of the logical device on the local storage device 710. The logical device on the local storage device 710 that is accessed by the host 702 may be referred to as the "R1 volume" (or just "R1") while the logical device on the remote storage device 720 that contains a copy of the data on the R1 volume is called the "R2 volume" (or just "R2"). Thus, the host reads and writes data from and to the R1 volume and RDF handles automatic copying and updating of the data from the R1 volume to the R2 volume and/or from the R2 volume to the R1 volume. For further discussion of RDF and the use thereof in data recovery and storage techniques, see, for example, U.S. Pat. No. 5,742,792 to Yanai, et al., entitled "Remote data mirroring," U.S. Pat. No. 7,657,718 to LeCrone et al., entitled "Storage automated replication processing," and U.S. Pat. No. 7,734,884 to Marshak et al., entitled "Simultaneous concurrent and cascaded triangular asynchronous replication," which are all incorporated herein by reference.

In connection with data stored the R1 and/or R2 volumes, the data integrity operations discussed herein may be applied to verify data integrity using a CRC pack, and/or other error detecting codes, of CRCs obtained from the stored data without having to read the stored data into a memory. For the source and destination devices (e.g., R1 or R2), each device may hash corresponding tracks (and/or may hash corresponding CRC packs) and share the hash results for comparison. If H(R1)=H(R2) then it is very likely that R1=R2. Whereas, if H(R1)!=H(R2) then it is known that R1 is different from R2. The system may be similarly be applied in connection with CKD devices further including the neutralization operations, as discussed elsewhere herein.

Generally, data integrity verification is provided identifying a data segment for integrity verification, in which the data segment includes user data and a plurality of error detecting codes corresponding to the user data. The data segment may be stored across multiple disk drives of a storage system, including different drives on storage devices that are separated remotely. A first operation is performed on the data segment that packs the plurality of error detecting codes into an error detecting code pack, where the error detecting code pack is smaller than the data segment. The error detecting code pack is used to verify data integrity of the data segment without reading (and/or possibly writing) the data segment.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for data integrity verification, comprising:
identifying a data segment for integrity verification, wherein the data segment includes user data and a plurality of error detecting codes corresponding to the user data, and wherein the data segment is stored across multiple disk drives of a storage system;
performing a first operation on the data segment that packs the plurality of error detecting codes into an error detecting code pack, wherein the error detecting code pack is smaller than the data segment; and
using the error detecting code pack to verify data integrity of the data segment without reading the data segment, wherein using the error detecting code pack to verify data integrity includes performing a second operation, being a hash operation, on the error detecting code pack to generate at least one hash word that is used for data integrity verification, wherein the at least one hash word has a smaller size than the error detecting code pack, and wherein, for the data integrity verification, the at least one hash word is compared with information corresponding to stored parity information of the data segment in a verification process that requires less processing resources than data verification by comparing the data segment to the stored parity information.

2. The method according to claim 1, wherein the second hash operation includes a 32 bit polynomial hash operation.

3. The method according to claim 1, wherein the multiple disk drives are part of a redundant array of independent disks (RAID) storage system, and wherein identifying the data segment for integrity verification includes performing a RAID integrity scan.

4. The method according to claim 1, wherein each of the error detecting codes is a data interchange format-cyclic redundancy check (DIF-CRC) code.

5. The method according to claim 1, wherein the data segment is a data segment of at least one of: a fixed block architecture system and a count key data architecture system.

6. The method according to claim 1, wherein verifying data integrity includes storing the error detecting code pack and comparing the error detecting code pack to information corresponding to stored parity information.

7. The method according to claim 1, wherein verifying data integrity includes storing the at least one hash word.

8. The method according to claim 1, wherein the data segment includes format data, and wherein the method further comprises:
after performing the first operation on the error detecting code pack, neutralizing each of the error detecting codes in the error detecting code pack to generate error detecting codes for which the format data is removed.

9. A non-transitory computer readable medium storing software for data integrity verification, the software comprising:
executable code that identifies a data segment for integrity verification, wherein the data segment includes user data and a plurality of error detecting codes corresponding to the user data, and wherein the data segment is stored across multiple disk drives;
executable code that performs a first operation on the data segment that packs the plurality of error detecting codes into an error detecting code pack, wherein the error detecting code pack is smaller than the data segment; and
executable code that uses the error detecting code pack to verify data integrity of the data segment without reading the data segment, wherein using the error detecting code pack to verify data integrity includes performing a second operation, being a hash operation, on the error detecting code pack to generate at least one hash word that is used for data integrity verification, wherein the at least one hash word has a smaller size than the error detecting code pack, and wherein, for the data integrity verification, the at least one hash word is compared with information corresponding to stored parity information of the data segment in a verification process that requires less processing resources than data verification by comparing the data segment to the stored parity information.

10. The non-transitory computer readable medium according to claim 9, wherein the second operation includes a 32 bit polynomial hash operation.

11. The non-transitory computer readable medium according to claim 9, wherein the multiple disk drives are part of a redundant array of independent disks (RAID) storage system, and wherein identifying the data segment for integrity verification includes performing a RAID integrity scan.

12. The non-transitory computer readable medium according to claim 9, wherein each of the error detecting codes is a data interchange format-cyclic redundancy check (DIF-CRC) code.

13. The non-transitory computer readable medium according to claim 9, wherein the data segment is a data segment of at least one of: a fixed block architecture system and a count key data architecture system.

14. The non-transitory computer readable medium according to claim 9, wherein the executable code that verifies data integrity includes executable code that stores the error detecting code pack and compares the error detecting code pack to information corresponding to stored parity information.

15. The non-transitory computer readable medium according to claim 9, wherein the executable code that verifies data integrity includes executable code that stores the hash word.

16. The non-transitory computer readable medium according to claim 9, wherein the data segment includes format data, and wherein the software further comprises:
executable code that, after performing the first operation on the error detecting code pack, neutralizes each of the error detecting codes in the error detecting code pack to generate error detecting codes for which the format data is removed.

17. A system for data integrity verification, comprising:
a memory;
at least one processor that accesses the memory, wherein the at least one processor performs functions of:
identifying a data segment for integrity verification, wherein the data segment includes user data and a plurality of error detecting codes corresponding to the user data, and wherein the data segment is stored across multiple disk drives of a storage system;
performing a first operation on the data segment that packs the plurality of error detecting codes into an error detecting code pack, wherein the error detecting code pack is smaller than the data segment; and
using the error detecting code pack to verify data integrity of the data segment without reading the data segment, wherein using the error detecting code pack to verify data integrity includes performing a second operation, being a hash operation, on the error detecting code pack to generate at least one hash word that is used for data integrity verification, wherein the at least one hash word has a smaller size than the error detecting code pack, and wherein, for the data integrity verification, the at least one hash word is compared with information corresponding to stored parity information of the data segment in a verification process that requires less processing resources than data verification by comparing the data segment to the stored parity information.

18. The system of claim 17, wherein the multiple disk drives are included in a redundant array of independent disks (RAID) storage system.

* * * * *